May 15, 1928. 1,670,054
J. J. TATUM
FREIGHT CAR TRUCK
Filed May 1, 1924 3 Sheets-Sheet 2
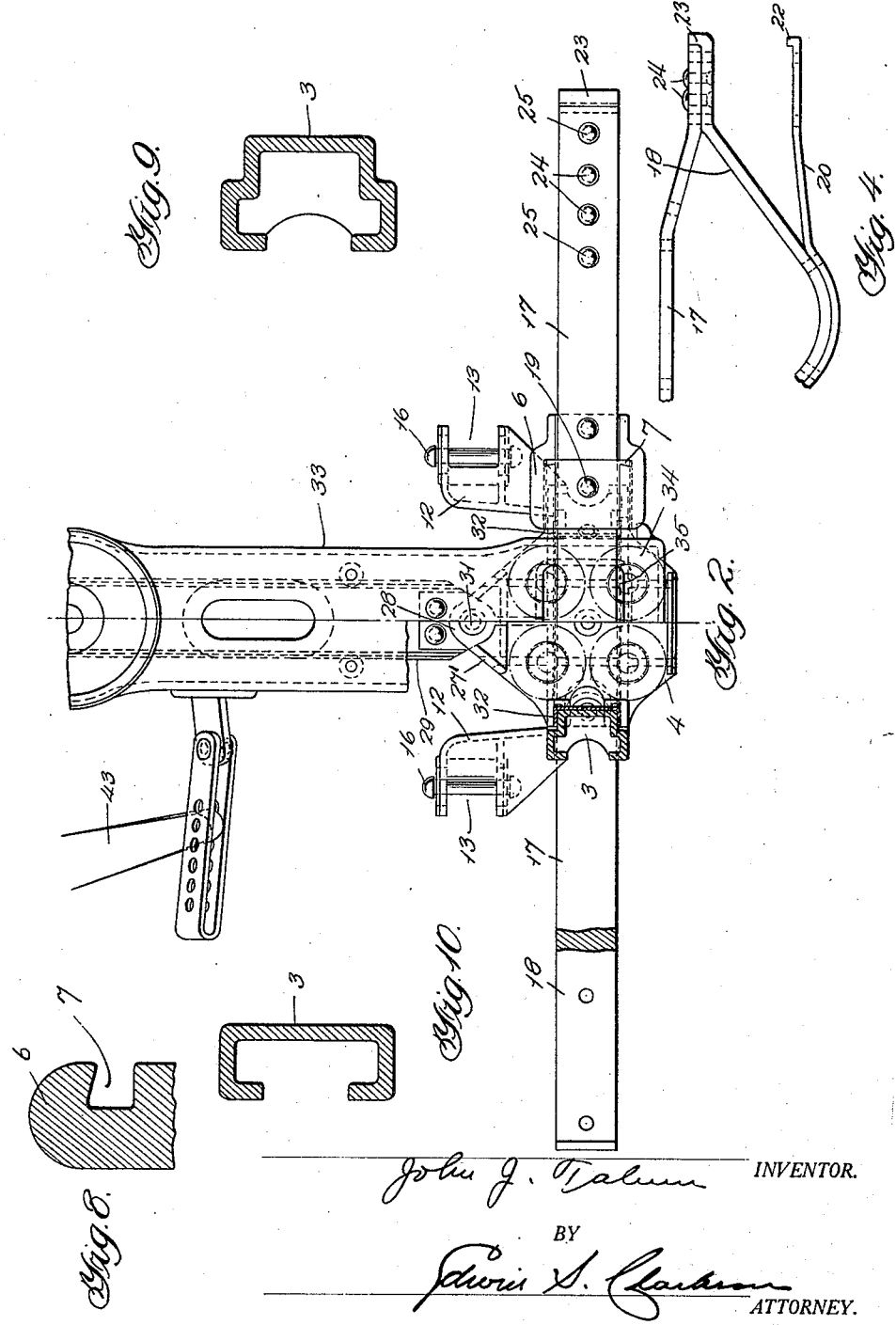

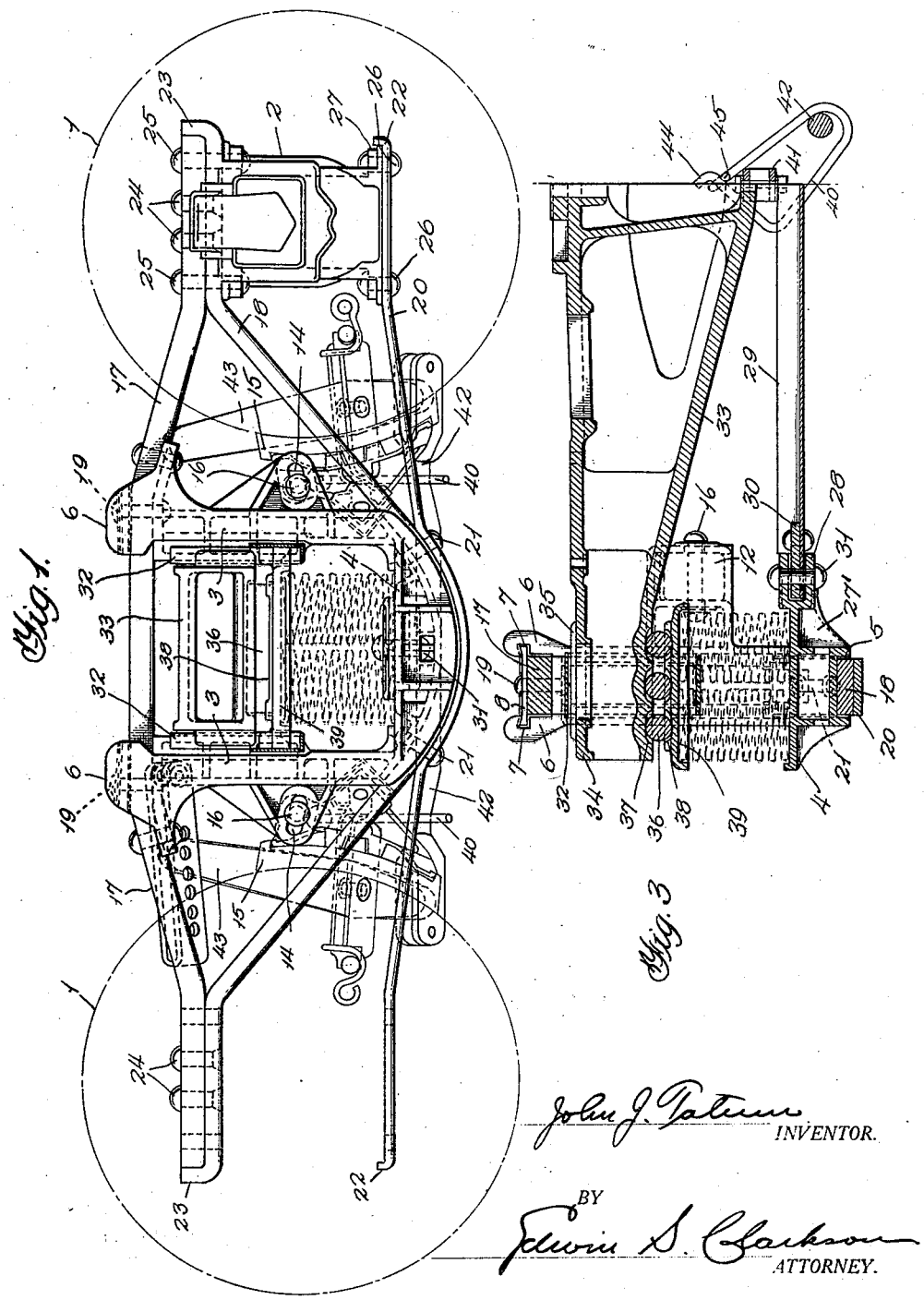

May 15, 1928.  J. J. TATUM  1,670,054
FREIGHT CAR TRUCK
Filed May 1, 1924   3 Sheets-Sheet 3
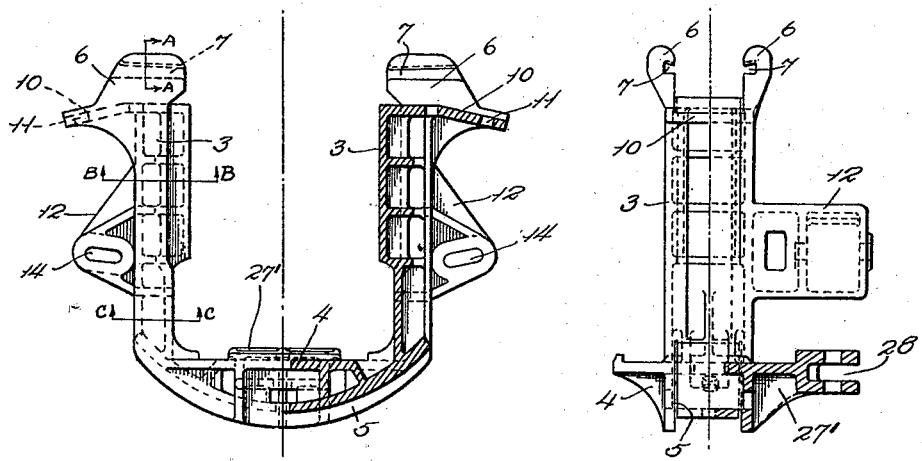
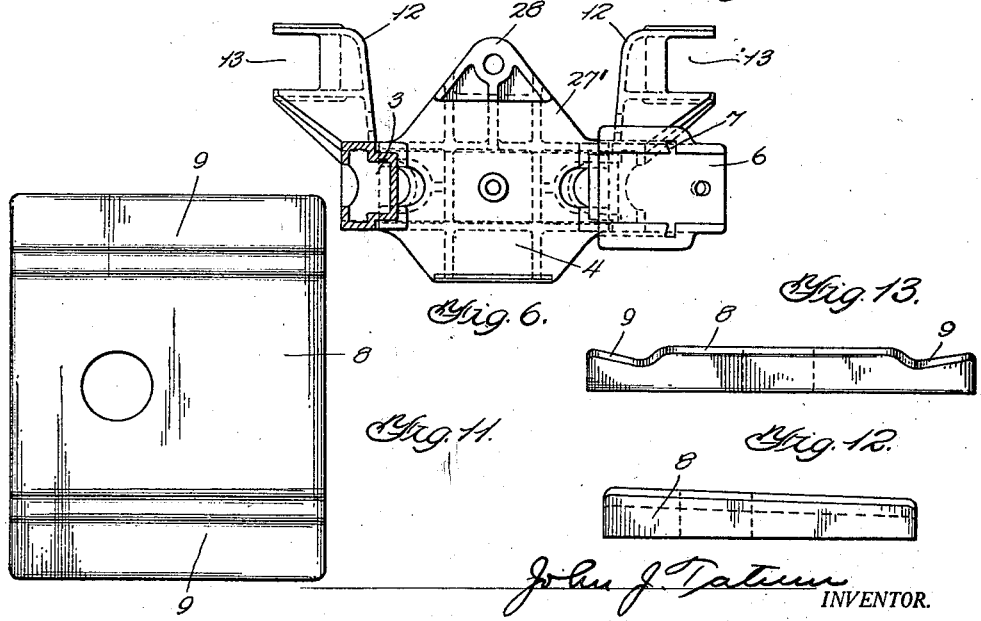
John J. Tatum INVENTOR.
BY Edwin S. Clarkson ATTORNEY.

Patented May 15, 1928.

1,670,054

UNITED STATES PATENT OFFICE.

JOHN J. TATUM, OF BALTIMORE, MARYLAND.

FREIGHT-CAR TRUCK.

Application filed May 1, 1924. Serial No. 710,399.

The object of my invention is to provide a freight car truck, the construction of which is such that it is not necessary to use bolts, nuts, pins, keys, washers or spring beams, which truck can be built or repaired in any shop or on any shop track where existing M. C. B. diamond shape arch bar trucks are built or repaired.

A further object of my invention is to provide for an assembly of M. C. B. journal boxes on the ends of the arch bars in such manner that the box may be removed, or replaced in any shop, or on any shop track without scrapping or damaging the arch bars or truck side frames.

A further object of my invention is to make possible the designing of a truck meeting M. C. B. standard requirements, by the use of M. C. B. standard parts, built within M. C. B. standard dimensions, and to meet M. C. B. standard third rail clearances.

A further object of my invention is to provide a pivotal connection between the two truck side frames so as to provide flexibility for the truck whereby the truck can automatically adjust itself in position to curves in the track, making its movement more free and easier in curves than can be had if the side frames were rigidly connected. Such flexibility reduces grinding of the wheel flange against the rail, providing against friction, thereby reducing train resistance, track wear and wheel flange wear.

A further object of my invention is to design a connection between the outer ends of the arch bars which provides resistance against the outward movement of the ends of the top arch bar from the load brought upon it.

A further object of my invention is to design a truck to eliminate brake beam hangers thereby lessening the number of pieces to be made use of and to be worn out in service and insuring safety against accidents; also eliminating the carrying of the load on the truck springs by rivets; and with these and other objects in view, my invention consists of the parts and combination of parts as will be hereinafter more fully set forth.

In the drawings:

Figure 1 is a side elevation of a freight car truck embodying my invention.

Figure 2 is a top plan view of the same.

Figure 3 is a transverse vertical section through the truck.

Figure 4 is a side elevation of the arch bars and a journal box supporting bar.

Figure 5 is a side elevation of the center frame, parts being in section.

Figure 6 is a top plan view of the same.

Figure 7 is an end elevation of Figures 5 and 6.

Figure 8 is a detail sectional view on the line A—A, Figure 5.

Figure 9 is a detail sectional view on the line B—B, Figure 5.

Figure 10 is a section on the line C—C, Figure 5.

Figure 11 is a top plan view of the key wedge.

Figure 12 is a side elevation of the same.

Figure 13 is an end elevation of the same.

The reference numeral 1 designates the wheels of the truck journalled in the journal box 2.

The center frame or member of my improved side truck frame comprises a substantial U shape member, the vertical elements of which constitute posts 3 connected by the bottom member, or element 4. The bottom member of the U shaped frame is provided in its under face with a groove 5 while the upper ends of the posts 3 are provided with grooves constituting seats 6, the side walls of said seats being provided with under cut slideways 7 in which a key 8 is adapted to move. This key 8, as will be seen from Figures 11, 12 and 13, has inclined side portions 9 of substantially wedge shape which are adapted to enter the grooves or seats 6 on the top of the posts 3 and become locked therein. As will be seen from Figure 12, the key 8 is wedge shape from one end to the other.

Extending in line with the seats 6 are brackets 10, which brackets are arranged on a downwardly inclined angle with respect to the seats 6, and are provided with a rivet opening 11, the bracket being, as far as its effective surface is concerned, of the same width as the seat 6. The cross sectional configuration of the posts 3 are fully illustrated in Figures 9 and 10 of the drawing.

Extending from the posts 3 is an integral lug, or casting 12, having the open jaw 13 in the side walls of which are formed an elongated slot 14 in which the brake head 15 is sustained, said elongated slots permitting forward and backward movement of the brake head and brake beam to accommodate the movement of these parts incident to the release and application of brakes. It will, of course, be understood that the rivet 16 suspends the brake head in the slots 14 of the bracket 12.

17 is the top arch bar and 18 is the bottom arch bar. The top arch bar is mounted in the seats 6 on the upper ends of the posts 3 of the center frame and is secured in said seats firmly by driving the keys 8 into said seats over the arch bar with the side wedge like edges of the keys in the grooves 7 in the side walls of the seat 6, and when said key is driven to proper position the key and the top arch bar are rigidly secured to the U shape frame by means of the rivet 19 as shown in several views. The outer ends of the top arch bar are each provided with four riveting openings as shown in the drawings. The bottom arch bar 18 is seated in the groove 5 in the bottom connecting member 4 of the U shape frame, as clearly shown in the several views particularly Figure 3. 20 is a journal box tie strap which, at its central portion, is secured to the bottom member 4 of the U shaped frame by means of the rivets 21, said rivets passing through the journal box tie strap, the lower arch bar 18 and the bottom member 4 of the U shape frame, as clearly shown in Figure 1. The outer ends of these journal box tie straps are turned upward as at 22, which turned portion constitutes a stop.

The outer ends of the lower arch bars 18 are provided with stops 23 against which the outer ends of the upper arch bars 17 abut, which stop provides a resistance against the outward movement of the ends of the top arch bar 17 under the load brought upon the top arch bar at the top of the posts 3 of the center frame.

The top and bottom arch bars are secured together at their outer end portions by rivets 24 while the journal box 2 is secured to these combined ends of the upper and lower arch bars by means of the rivets 25 and to the journal box tie rod by means of the rivets 26, the rivets 25 and 26 being in vertical alignment with each other, and the journal box at its lower end having a base flange 27 which abuts the stop 22 on the tie rod 20. In this construction it will be seen that all that is necessary to enable one to remove the journal box 2 is to cut the rivets 25 and 26, which can be done without damaging in any way the arch bars 17 and 18, or the tie rod 20, thereby making it possible to easily remove the journal box without scrapping or damaging the arch bars, or truck side frames.

The U shape frames are provided at their lower ends and extending from the bottom member 4 with a bracket 27' terminating in a forked end 28. 29 is a side frame tie bar preferably of channel shape having riveted to each end a plate 30, which plate is pivotally mounted in the forked end 28 on the rivet 31 whereby the two side frames are connected by a pivoted connection to provide flexibility for the truck to adjust itself to position, or curves in the track, making its movement more free and easy in curves than could be had if the side frames were rigidly connected as was heretofore the practice. Such flexibility reduces grinding of the wheel flange against the rail, provides against friction, thereby reducing train resistance, track wear and wheel flange wear.

It will be observed that by reason of the fact that the top arch bar is secured to the top of the posts by rivets 19, the U shaped frame is held from spreading from a fixed position under all service stresses.

32 are wear plates secured to the inner face of the posts 3 for the truck bolster 33 and on bottom member 4 is arranged a floor for the truck bolster springs to rest upon, said floor having upwardly projecting flanges 35 for holding the springs in position.

The ends of the bolsters are mounted upon rollers or balls 36, seats 37 being formed in the bolster and seats 38 being formed in the bearing plate 39 for said bearings.

A safety loop 40 is provided to fit around the brake beam 41 and the bottom brake lever connecting rod 42 to prevent the bottom brake lever connecting rod from falling down accidentally and engaging the tracks, or cross ties, in the event of the bottom connecting rod becoming disengaged from the brake lever 43.

This safety loop 40, after being placed in position, shown in Figure 3, is locked in the closed position shown by bending the end 44 upward after it passes through the eye 45 whereby the loop is securely locked in closed position against accidental opening under all service conditions, and at the same time the rod 42 is free to adapt itself to all service conditions without imposing any strain on the loop 40.

It will be noted that in removing the journal box it is unnecessary to disturb the rivets 24 connecting the ends of the top and bottom arch bars.

What I claim is:

1. In a truck side frame an integral U shaped center member, the vertical members of which constitute column posts adapted to receive the truck bolster between them, a seat in the top of each post adapted to receive the top arch bar of the truck, and a key way slot in the inner side face of the walls of said seat.

2. In a truck side frame an integral U shaped center member, the vertical members of which constitute column posts adapted to receive the truck bolster between them, a seat in the top of each post adapted to receive the top arch bar of the truck, and a key way slot in the inner side face of the walls of said seat, and a key adapted to enter said seat and keyways.

3. In a truck side frame, a U shaped center member, the vertical elements of which constitute posts adapted to receive the truck bolster between them, a seat in the top of each post, and a bracket extending from each post and in line with said seats, said seats and brackets adapted to receive the top arch bar of the truck.

4. In a car truck side frame, an integral U shaped member, the vertical members of which constitute column posts adapted to receive the truck bolster between them, a seat in the top of each post adapted to receive the top bar of said frame and a key way slot in the inner face of the walls of said seat, and keys adapted to enter the said seat and keyways, whereby the load placed in the U shaped center may be carried on the keys adapted to enter the said seat and keyways.

5. In a car truck side frame an integral U shaped center member with a circular bearing on the underside for the bottom arch bar to seat upon, the vertical members of which constitute column posts, a top arch bar seat on the upper ends of said posts, a bracket extending from the outer side of the posts and constituting a prolongation of said top arch bar seat to fit the underside of the top arch bar, and for securing to the top arch bar to prevent outward movement of the vertical members from the side thrust of the truck bolster.

6. A truck side frame, including an integral center U shape member adapted to receive the truck bolster, the vertical members of the U shape frame constituting posts, a seat on the top of each post to receive the top arch bar of the truck, key ways in the inner face of the side walls of said seat, brackets extending from said posts and constituting extensions of said seats, an arcuate seat on the bottom face of the said member to receive the lower arch bar of the frame, a bracket extending outwardly from the inner face of the said member adapted to receive a tie rod, and lugs extending from the sides of said posts adapted to support brake shoes, all being cast integrally.

7. In a truck side frame having a U shaped center member, the vertical members of which constitute column posts to receive the truck bolster between them, a seat in the top of each post adapted to receive the top arch bar of the truck, and a key way slot in the inner side face of the walls of said seat, and a key adapted to enter said seat key way, and with a projecting jaw on the inside of the bottom portion of the U shaped center member, providing pivoted connection means for a tie between the two U shaped center members.

In testimony whereof I affix my signature.

JOHN J. TATUM.